(12) United States Patent
Naito (10) Patent No.: US 6,205,375 B1
(45) Date of Patent: Mar. 20, 2001

(54) VEHICLE STABILITY CONTROL APPARATUS

(75) Inventor: Genpei Naito, Kanagawa-ken (JP)

(73) Assignee: Nissan Motor Co., Ltd, Yokohama (JP)

( * ) Notice: Subject to any disclaimer, the term of this patent is extended or adjusted under 35 U.S.C. 154(b) by 0 days.

(21) Appl. No.: 09/453,062

(22) Filed: Dec. 2, 1999

(30) Foreign Application Priority Data

Dec. 2, 1998 (JP) .................................................. 10-342539

(51) Int. Cl.[7] .............................. C06F 7/00; C06F 17/00
(52) U.S. Cl. .................................. 701/1; 701/71; 701/91; 701/38; 303/140; 303/146; 280/5.507
(58) Field of Search ................................... 701/1, 38, 53, 701/91, 71; 303/140, 146, 5.507

(56) References Cited

U.S. PATENT DOCUMENTS

| | | | |
|---|---|---|---|
| 5,710,705 | * | 1/1998 | Eckert ...................................... 701/83 |
| 5,720,533 | * | 2/1998 | Pastor et al. .......................... 303/147 |
| 5,732,379 | * | 3/1998 | Eckert et al. ........................... 701/83 |
| 5,774,821 | * | 6/1998 | Eckert ...................................... 701/78 |
| 5,862,503 | * | 1/1999 | Eckert et al. ........................... 701/78 |
| 5,863,105 | * | 1/1999 | Sano ...................................... 303/146 |
| 6,035,251 | * | 3/2000 | Hac et al. ............................... 701/70 |
| 6,122,584 | * | 9/2000 | Lin et al. ................................ 701/70 |

* cited by examiner

Primary Examiner—William A. Cuchlinski, Jr.
Assistant Examiner—Ogla Hernandez
(74) Attorney, Agent, or Firm—Foley & Lardner (57) ABSTRACT

A vehicle stability control apparatus calculates a desired yaw rate from the angle of the steering wheel and vehicle's velocity and always executes control so as to have the actual yaw rate correspond to the desired yaw rate. Both of the front wheels' braking force and the rear wheels' braking force are operated according to the amendment momentum calculated by a control in response to the yaw rate difference. However, the actual yaw rate cannot be accurately corresponded to the desired yawing moment without delay when the driver operates a steering wheel rapidly in the emergency evasion condition, the control unit increases the amendment momentum right after the emergency evasion condition. Furthermore, the control unit decreases the amendment momentum when the vehicle is converging on straight-ahead driving.

16 Claims, 7 Drawing Sheets

FIG. 4(a) AMENDMENT MOMENTUM

FIG. 4(b) YAW RATE

FIG. 4(c)

FIG. 4(d) VEHICLE'S BEHAVIOR

FIG. 7(a)
AMENDMENT MOMENTUM

FIG. 7(b)
YAW RATE

FIG. 7(c)

FIG. 7(d)
VEHICLE'S BEHAVIOR

VEHICLE STABILITY CONTROL APPARATUS

CROSS REFERENCE TO RELATED APPLICATIONS

The entire contents of Japanese application Tokugan Hei 10-342539, with a filing date of Dec. 2, 1998 in Japan, are hereby incorporated by reference.

BACKGROUND OF THE INVENTION

The invention relates to a vehicle stability control apparatus, which calculates the desired yaw rate from the exerted force on the vehicle or the generating physical quantity on the vehicle and executes feedback control so as to have the actual yaw rate correspond to the desired yaw rate. Particularly, this invention is applicable to an apparatus that can execute the feedback control such as a four wheel steer apparatus which steers individually both of the front wheels and the rear wheels, a limited slip differential control apparatus which controls the engagement power between front wheels and rear wheels or between right and left wheels, a braking force control apparatus, a stabilizer control apparatus or an active control suspension apparatus which is capable of adjusting the rolling rigidity.

As one example, Japanese Patent Kokai No. 9-2316 discloses a vehicle stability control apparatus that calculates a desired yaw rate from the angle of the steering wheel and the vehicle's velocity, and always executes control so as to have the actual yaw rate correspond to the desired yaw rate. With such conventional apparatus, when the vehicle is quickly turned so as to change lanes for emergency evasion on a low friction road such as an icy road, the feedback control is executed so as to make the actual yaw rate correspond to the desired yaw rate. However, the actual yaw rate cannot be accurately corresponded to the desired yawing moment without delay because the tires can not generate lateral force, braking force and traction force transmitted on a road. Accordingly, a delay of phase of the vehicle's yaw rate becomes large in comparison to a driver's steering operation when the vehicle is converging on straight-ahead driving, and driver tends to over-correct the vehicle's behavior.

BRIEF SUMMARY OF THE INVENTION

It is an object of the present invention to provide a vehicle stability control apparatus, which can executes stability control well even if a delay of phase of the vehicle's yaw rate becomes large when the driver operates rapidly a steering wheel during the emergency evasion condition.

According to one aspect of the present invention, there is provided a vehicle stability control apparatus, comprising: a yaw rate sensor to detect a yaw rate of a vehicle; a physical amount detector to detect a physical amount input in the vehicle; a yaw momentum control apparatus to control yaw momentum of the vehicle in response to a control signal; and a control unit operatively coupled with the yaw rate sensor, the physical amount detector, and a yaw momentum control apparatus; wherein the control unit calculates a first desired yaw rate for the vehicle from the physical amount; the control unit sets the first desired yaw rate as a desired yaw rate; the control unit judges that the vehicle is in an emergency evasion condition when the difference between the yaw rate and the first yaw rate is larger than a first value; the control unit sets 0 or nearly 0 as a desired yaw rate when the control unit judges that the vehicle is in the emergency evasion condition; and the control unit applies the control signal to the yaw momentum control apparatus to reduce the difference between the yaw rate and the desired yaw rate.

There is also provided a vehicle stability control apparatus, comprising: a yaw rate sensor to detect a yaw rate of a vehicle; a physical amount detector to detect a physical amount input in the vehicle; a yaw momentum control apparatus to control yaw momentum of the vehicle in response to a control signal; and a control unit operatively coupled with the yaw rate sensor, the physical amount detector, and a yaw momentum control apparatus; wherein the control unit calculates a first desired yaw rate for the vehicle from the physical amount; the control unit judges whether the vehicle is in a normal condition or an emergency evasion condition, the control unit judging that the vehicle changes from the normal condition to the emergency evasion condition when the difference between the yaw rate and the first yaw rate is larger than a first value; the control unit sets the first desired yaw rate as a desired yaw rate; the control unit sets 0 or nearly 0 as the desired yaw rate when the control unit judges that the vehicle is in the emergency evasion condition; the control unit applies the control signal to the yaw momentum control apparatus to reduce the difference between the yaw rate and the desired yaw rate.

DETAILED DESCRIPTION OF THE PREFERRED EMBODIMENTS

Figure 1:
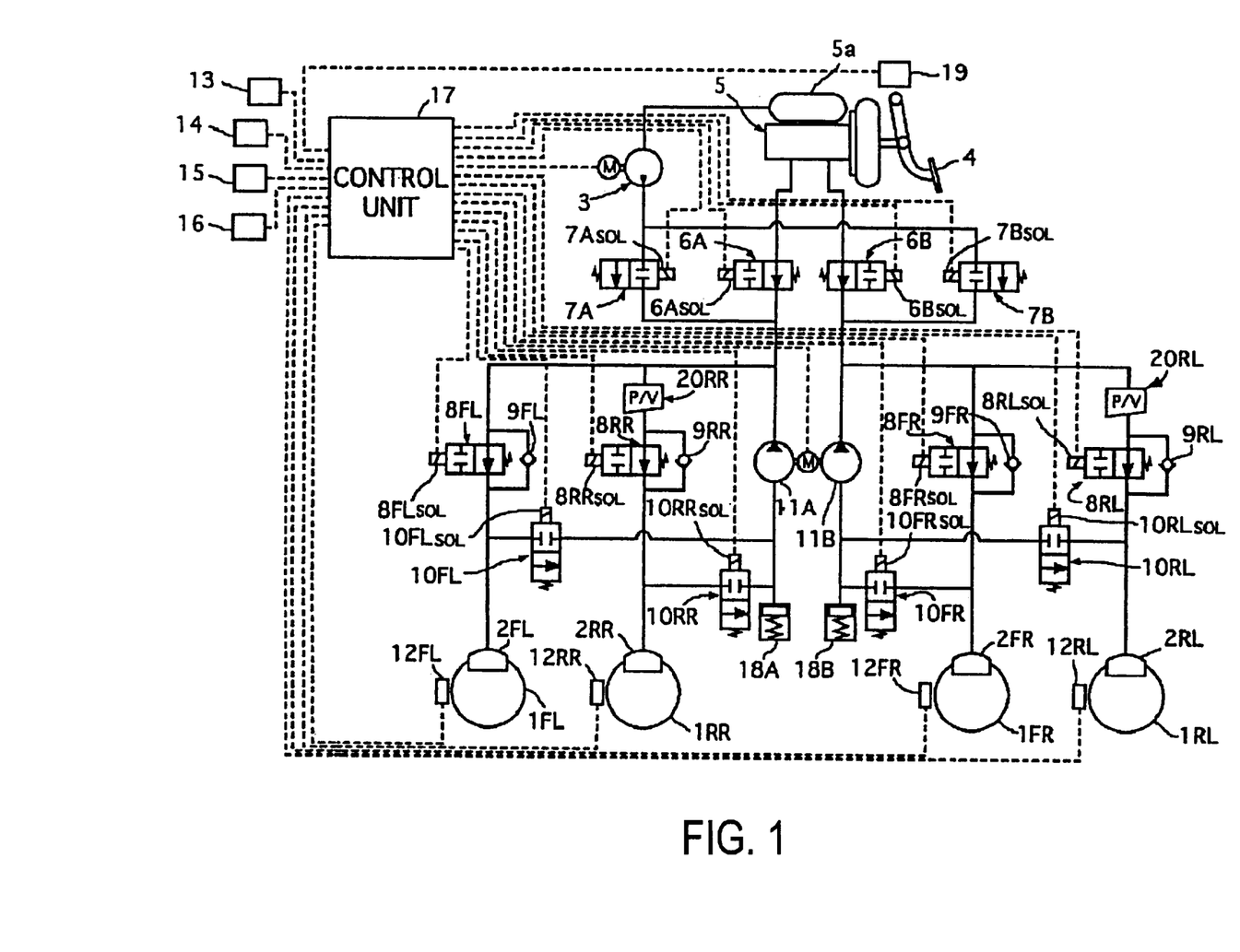
FIG. 1 is a schematic diagram showing one embodiment of a braking force control apparatus according to the present invention.

With reference to the drawings, and in particular to FIG. 1, there is shown a schematic diagram of a braking force control apparatus embodying the vehicle stability control apparatus. The front wheels 1FL, 1FR and the rear wheels 1RL, 1RR are associated with respective wheel cylinders 2FL~2RR for applying the braking force. The wheel cylinders 2FL~2RR brake the wheel by pressing pads against disc rotors.

A master cylinder 5 generates master cylinder pressures for dual hydraulic circuits according to the operation of the brake pedal 4. These dual hydraulic circuits are independently separated and called X circuit or diagonal split circuit. One hydraulic circuit connects the master cylinder 5 with a front left wheel cylinder 2FL and a rear right wheel cylinder 2RR. The other hydraulic circuit connects the master cylinder 5 with a front right wheel cylinder 2FR and a rear left wheel cylinder 2RL. In this embodiment proportioning valves 20RL, 20RR are installed between the master cylinder 5 and each of the rear wheel cylinders 2RL, 2RR. These proportioning valves 20RL, 20RR control the rear braking force increase rate smaller than the front braking force increase rate in order to bring real braking force distribution and ideal braking distribution between the front wheels and the rear wheels into closer relationship based on the wheel load changing during braking. Conventional types can be installed as these proportioning valves 20RL, 20RR.

Master cylinder cutting valves 6A and 6B are installed between the master cylinder 5 and the wheel cylinders 2FL, 2RR or the wheel cylinders 2FR, 2RL, to connect or cut for respective hydraulic circuits. And a pressure increasing pump 3 is installed so as to press the hydraulic fluid in a master tank reservoir 5a. The hydraulic fluid under pressure is diverged and provided for the hydraulic circuits which are downstream of the master cylinder cutting valves 6A and 6B. That is, the pressure increasing pump 3 is connected with the conduit which is between the master cylinder cutting valve 6A and the wheel cylinders 2FL, 2RR. Similarly, the pressure increasing pump 3 is connected with the conduit which is between the master cylinder cutting valve 6B and the wheel cylinders 2FR, 2RL. And pressure increasing pump cutting valves 7A, 7B are installed between the pressure increasing pump 3 and the hydraulic circuits so as to connect and cut both of them.

The master cylinder 5 or the pressure increasing pump 3 can be regarded as a braking pressure source for the hydraulic circuits when either of them is connected with the wheel cylinders 2FL~2RR. Pressure increasing valves 8FL, 8FR, 8RL, and 8RR are respectively installed upstream of the wheel cylinders 2FL~2RR. In addition, braking fluid pressure of the braking pressure source is also described as a line pressure for convenience. Check valves 9FL, 9FR, 9RL, and 9RR are respectively installed in by-pass conduits, which are respectively parallel with the pressure increasing valves 8FL, 8FR, 8RL, and 8RR. These check valves 9FL, 9FR, 9RL, and 9RR permit flow only towards the master cylinder 5 so that braking fluid in the wheel cylinders 2FL~2Rr are rapidly returned to the master cylinder 5 when the brake pedal 4 is released.

Pressure reducing pumps 11A and 11B have respectively exhaust or discharge ports connected with the braking pressure source. The pressure reducing pump 11A has an intake or suction port connected through reducing valves 10FL and 10RR to the respective wheel cylinders 2FL and 2RR. And the pressure reducing pump 11B has an intake or suction port connected through reducing valves 10FR and 10RL to the respective wheel cylinders 2FR and 2RL. These pressure reducing pumps 11A and 11B are driven by a common motor. Furthermore, reservoir 18A is installed between the pressure reducing pump 11A and the reducing valves 10FL and 10RR so as to accumulate the braking fluid and to absorb pressure fluctuations. Similarly, reservoir 18B is installed between the pressure reducing pump 11B and the reducing valves 10FR and 10RL.

The above-mentioned valves 6A, 6B, 7A, 7B, 8FL, 8FR, 8RL, 8RR, 10FR, 10RL, 10FL and 10RR are solenoid valves operable, on a control signal fed thereto from a control unit 17 which is described later, to occupy one of two positions. The master cylinder cutting valves 6A and 6B are placed under the open position, which allow the braking fluid through in the absence of the control signal. The pressure increasing pump cutting valves 7A and 7B are placed under the closed position, which does not allow the braking fluid through in the absence of the control signal. The pressure increasing valves 8FL, 8FR, 8RL, and 8RR are placed under the open position, which allow the braking fluid through in the absence of the control signal. The reducing valves 10FL, 10FR, 10RL, and 10RR are placed under the closed position, which does not allow the braking fluid through in the absence of the control signal. These valves 6A, 6B, 7A, 7B, 8FL, 8FR, 8RL, 8RR, 10FR, 10RL, 10FL and 10RR are changed to the opposite position when each of solenoids valves 6A, 6B, 7A, 7B, 8FL, 8FR, 8RL, 8RR, 10FR, 10RL, 10FL and 10RR are energized by the presence of the control signal. The pressure increasing pump 3 and the pressure reducing pump 11A and 11B are driven, on a control signal fed thereto from the control unit 17.

For example, when the control unit 17 increases the braking fluid pressure of the respective wheel cylinders 2FL~2RR to control the vehicle, the control unit 17 closes the master cylinder cutting valves 6A and 6B, drives the pressure increasing pump 3 when the pressure increasing cutting valves 7A and 7B are opened, and feeds the braking fluid into the wheel cylinders 2FL~2RR by opening the pressure increasing valves 8FL~8RR when the reducing valves 10FL~10RR are closed.

For example, when the control unit 17 decreases the braking fluid pressure of the respective wheel cylinders 2FL~2RR to control the vehicle, the control unit 17 drives the reducing pump 11A and 11B when the master cylinder cutting valves 6A and 6B and the pressure increasing cutting valves 7A and 7B are closed, and discharges the braking fluid from the wheel cylinders 2FL~2RR by opening the pressure reducing valves 10FL~10RR when the reducing valves 8FL~8RR are closed.

It is to be understood that the control unit 17 may open the master cylinder valves 6A and 6B in order to decrease the reaction force exerted on the braking pedal 4 when it is operated. In this embodiment, the braking force and the braking fluid pressure (wheel cylinder pressure) increase together. And the braking force and the braking fluid pressure are reduced together.

Wheel speed sensors 12FL~12RR, which input sinusoidal signals according to the respective wheel's speeds, are provided for the respective wheels 1FL~1RR in order to detect the wheel's speeds. A yaw rate sensor 13 is provided to detect the yaw rate $\psi$ of the vehicle. An angular sensor 14 is provided to detect angular positioning $\theta$ of a steering wheel. An acceleration sensor 15 is provided to detect vehicle longitudinal acceleration and vehicle lateral acceleration. Line pressure sensors 16 are provided to detect line pressure PMC of each braking circuit. A brake stroke sensor 19 is provided to detect the brake stroke quantity $\eta$ by measuring the brake pedal's stroke. All of the detected signals by these sensors are input into the control unit 17. Further, the yaw rate $\psi$ from the yaw rate sensor 13 and the angular positioning $\theta$ from the angular sensor 14 have positive direction's value and negative direction's value. In this embodiment, when the vehicle is turned to right, the yaw rate $\psi$ and the angular positioning $\theta$ are established as the yaw rate $\psi>0$, the angular positioning $\theta>0$. The brake stroke quantity $\eta$ from the brake stroke sensor 19 is a digital signal which increases in a step, and indicates a theoretical value 0, which means OFF when the brake pedal 4 is not operated.

The control unit 17 employs a digital computer which includes an input interface circuit, a central processing unit (CPU), a read only memory (ROM), a random access memory (RAM) and an output interface circuit. The central processing unit communicates with the rest of the computer via a data bus. The input interface circuit includes an analog-to-digital converter which receives analog signals from various sensors and converts them into digital form for application to the central processing unit. The read only memory contains programs for operating the central processing unit and further contains appropriate data in the form of lookup tables used in calculating appropriate values for the duty ratios of the control signals applied to the solenoid valves. Control words specifying desired duty ratios are periodically transferred by the central processing unit to the output interface circuit which converts the received control words into corresponding control signals to the solenoid valves.

Figure 2:
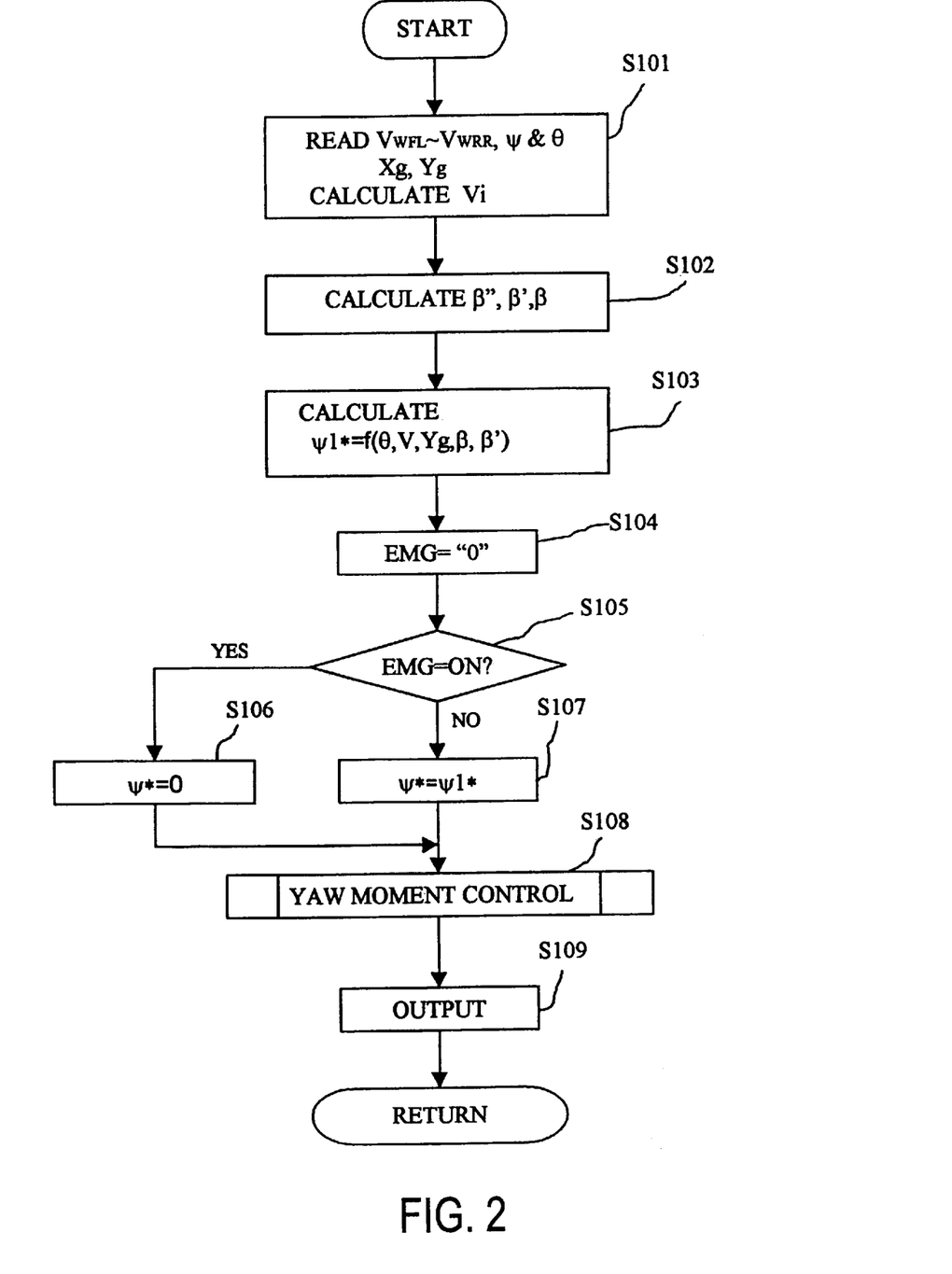
FIG. 2 is a flow chart illustrating the programming of the digital computer as it is used for the vehicle yaw rate control apparatus.
Figure 3:
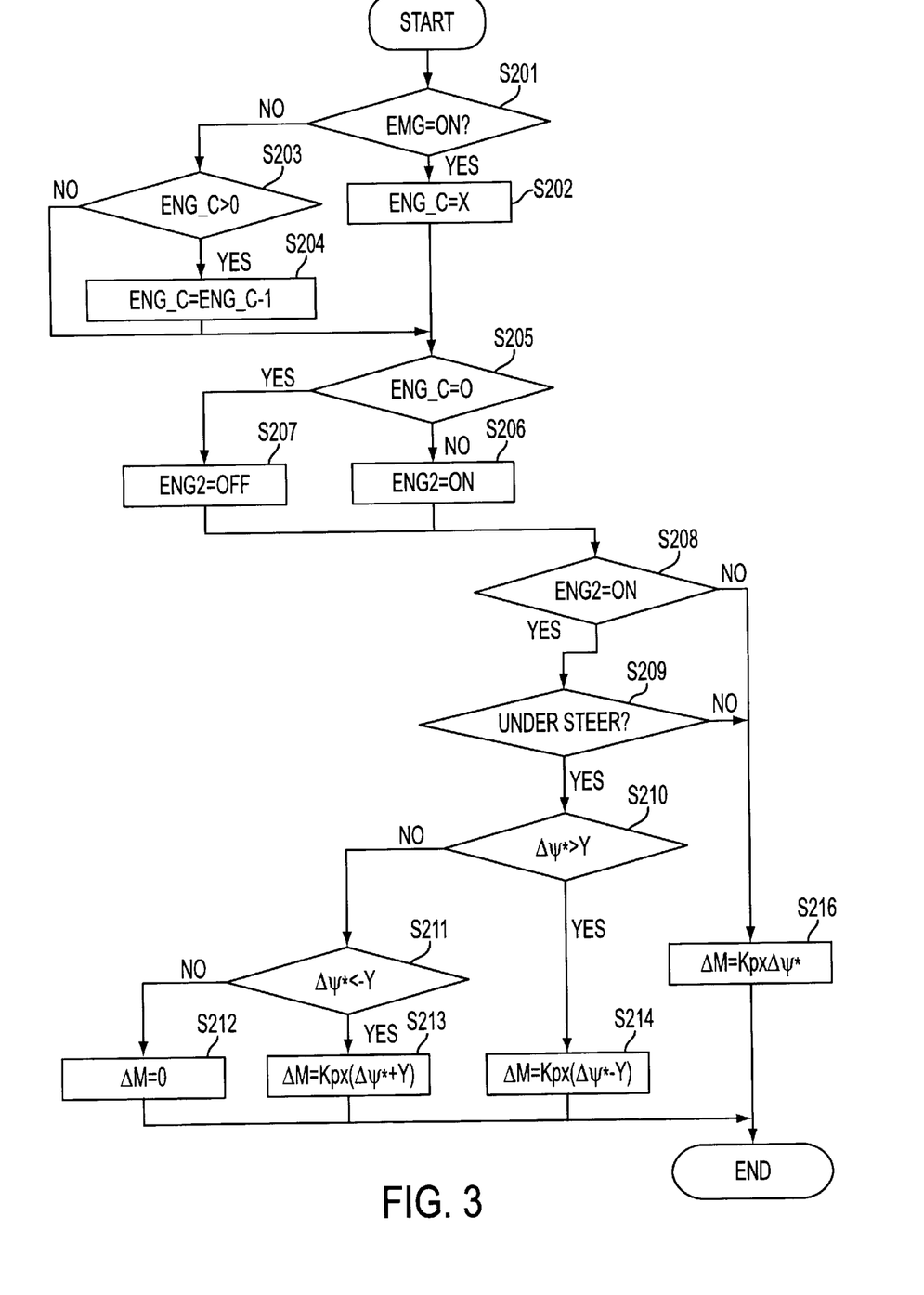
FIG. 3 is a flow chart illustrating the programming of the digital computer as it is used for the vehicle yaw rate control apparatus.

FIG. 2 and FIG. 3 are a flow chart illustrating the programming of the digital computer as it is used for the vehicle yaw rate control apparatus.

At step S101, wheel speed, angular positioning $\theta$ of steering wheel, vehicle longitudinal acceleration Xg, vehicle lateral acceleration Yg, and yaw rate $\psi$ are read into the computer memory. Furthermore, pseudo vehicle speed Vi is calculated by the following way. In this embodiment, the respective wheel speeds Vw are converted into signals Vwfi (l=1~4) using a low-pass filter which eliminates high frequency components of the wheel speed signals which are not a good indication at vehicle speed. And when the vehicle is not braked, vehicle speed Vi is determined on the basis of the smallest Vwfi. When the vehicle is braked, the biggest Vwfi is selected as vehicle speed Vw. Further, it is possible to calculate by integrating vehicle longitudinal acceleration Xg and to compensate the vehicle speed which is calculated from wheel's speed.

At the step S102, vehicle lateral slip acceleration $\beta''$ is calculated by the following equation from the lateral acceleration Yg, pseudo vehicle speed Vi and yaw rate $\psi$.

$$\beta''=Yg-Vi\cdot\psi$$

Vehicle lateral slip speed $\beta'$ is calculated by integrating this vehicle lateral slip acceleration $\beta''$. Vehicle lateral slip angle $\beta$ is calculated from the ratio of pseudo vehicle speed Vi and vehicle lateral slip speed $\beta'$, that is $\beta'/Vi$.

At the step S103, first desired yaw rate $\psi 1^*$ is calculated from angular positioning $\theta$ of the steering wheel and pseudo vehicle speed Vi. The desired yaw rate $\psi 1^*$ corresponds to the yaw rate which is generated when the respective wheels generate proper cornering force and the vehicle is coasting with neutral steering. It is to be understood that first desired yaw rate $\psi 1^*$ may be calculated from maps formed by angular positioning $\theta$ of the steering wheel and pseudo vehicle speed Vi.

The point of the invention is executed at the step S104 through the step S107. This flow is concerned with changing the desired yaw rate by the emergency evasion judging.

At the step S104, the control unit 17 makes sure that the emergency evasion judging flag EMG is "off".

At the step S105, the control unit 17 calculates a yaw rate difference dYaw by the following equation.

$$dYaw=\psi 1^*-\psi$$

A condition of the emergency evasion judging is decided as $$\psi>0 \text{ and } dYaw<-A \quad (1)$$

$$\psi<0 \text{ and } dYaw>A \quad (2)$$

If either of the condition (1) and (2) is effected, the control unit 17 makes sure that the emergency evasion judging flag EMG is "on". The control unit 17 can judge whether or not the vehicle behavior is in the condition of under steering or over steering by seeing both of yaw rate $\psi$ and yaw rate difference dYaw. Both of the conditions (1) and (2) show that the vehicle behavior is in the condition of over steering and the yaw rate difference dYaw is big.

On the other hand, a condition for how to finish the emergency evasion judging is decided as $$|\psi|<B \quad (1)$$

$$\psi>0, \psi^*>0, \psi 1^*>\psi \quad (2)$$

$$\psi<0, \psi^*<0, \psi 1^*<\psi \quad (3)$$

If the condition (1), (2) or (3) is effected, the control unit 17 makes sure that the emergency evasion judging flag EMG is "off". Incidentally, the condition (2) and (3) judges whether the respective yaw rate and the desired yaw rate are positive or negative and judges whether the yaw rate become smaller than the desired yaw rate. It is to be understood that the condition may judge whether the yaw rate difference between the yaw rate and the desired yaw rate is smaller than a determined value and finish the emergency evasion.

The condition (1) indicates that the yaw rate $\psi$ becomes smaller than a determined value B, which means that the vehicle is going on straight. The conditions (2) and (3) indicate that the driver operates a steering wheel to converge the vehicle's yaw motion on straight-ahead driving and the yaw rate converges on the desired yaw rate.

At the step S105, if the emergency evasion judging flag EMG is on, the control unit 17 sets 0 as the desired yaw rate $\psi^*$ at the step S106. On the other hand, at the step S105, if the emergency evasion judging flag EMG is off, the control unit 17 sets the first desired yaw rate $\psi 1^*$ as the desired yaw rate $\psi^*$ at the step S107. At the step S108, the control unit 17 calculates the difference (or the amount of change of the difference) between the desired yaw rate $\psi^*$ and the yaw rate $\psi$ as a condition value, which corresponds to the cornering state. The control unit 17 calculates the amendment momentum M* according to the difference. And the control unit 17 calculates a desired braking force of the respective wheel cylinders in order to realize said amendment momentum M*.

At the step S109, the control unit 17 calculates a desired wheel cylinder pressure of the respective wheel cylinders according to the braking force and controls the wheel cylinder pressure through a pressure servo.

At the step S108, the control unit 17 executes to restrain the yaw rate that exerts the vehicle toward an inward curve for a predetermined time right after the control unit 17 changes the emergency evasion judging flag EMG off from on. This is shown in detail in the FIG. 3.

At the step S201, the control unit 17 judges whether or not the emergency evasion judging flag EMG is on. If the emergency evasion judging flag EMG is on, the control unit 17 proceeds to the step S202. At the step S202, the control unit 17 sets a counter value to be X, which corresponds to the predetermined time. On the other hand, if the emergency evasion judging flag EMG is off, the control unit 17 proceeds to the steps S203, S204. And at the steps S203, S204, the control unit 17 decreases the counter value EMG_C step by step. At the step S205, the control unit 17 judges whether or not the counter value EMG_C is 0. If the counter value EMG_C is not 0, the control unit 17 proceeds to the step S206 and sets a flag EMG2 to on, which means that the predetermined time is set to restrain under steer after evasion emergency. If the counter value EMG_C is 0, the control unit 17 proceeds to the step S207 and sets the flag EMG2 to off.

At the step S208, if the flag EMG2 is on, the control unit 17 proceeds to the step S209.

At the step S209, the control unit judges whether or not the vehicle is in the condition of under steer. If the control unit judges the vehicle is in the condition of under steer, the control unit 17 proceeds to the step S210. At the step S210, the control unit 17 compares the yaw rate difference $\Delta\psi^*$ between the desired yaw rate $\psi^*$ and the yaw rate $\psi$ with an offset value Y. This offset value Y is smaller than a determined value B. If the yaw rate difference $\Delta\psi^*$ is smaller than the offset value Y, the control unit 17 proceeds to the step S211. At the step S211, if the yaw rate difference is bigger than the offset value $-Y$, the control unit 17 proceeds to the step S212. At the step S212, the amendment momentum $\Delta M^*$ is calculated as 0. If the yaw rate difference $\Delta\psi^*>Y$, the control unit 17 proceeds to the step S214 and calculates the amendment momentum $\Delta M^*$ as $\Delta M = Kp \times (\Delta\psi^* - Y)$. If the yaw rate difference $\Delta\psi^* < Y$, the control unit 17 proceeds to the step S214 and calculates the amendment momentum $\Delta M^*$ as $\Delta M = Kp \times (\Delta\psi^* + Y)$.

If ENG2≠0 at the step S208 or if the control unit judges the vehicle is not in the condition of under steer at the step S209, the control unit proceeds to the step S216 and calculates the amendment momentum $\Delta M^*$ as $\Delta M = Kp \times \Delta\psi^*$.

In this embodiment, the predetermined offset value Y is subtracted from the difference $\Delta\psi^*$, which should be a basic value for feedback control. It is possible to make the feedback control gain Kp set smaller or 0 to decrease the amendment momentum $\Delta M^*$.

Figure 4A:
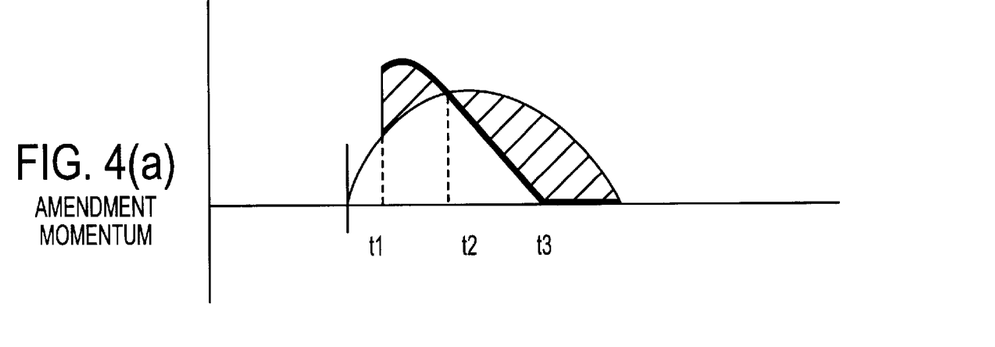
FIG. 4a is a time chart showing the amendment momentum.
Figure 4B:
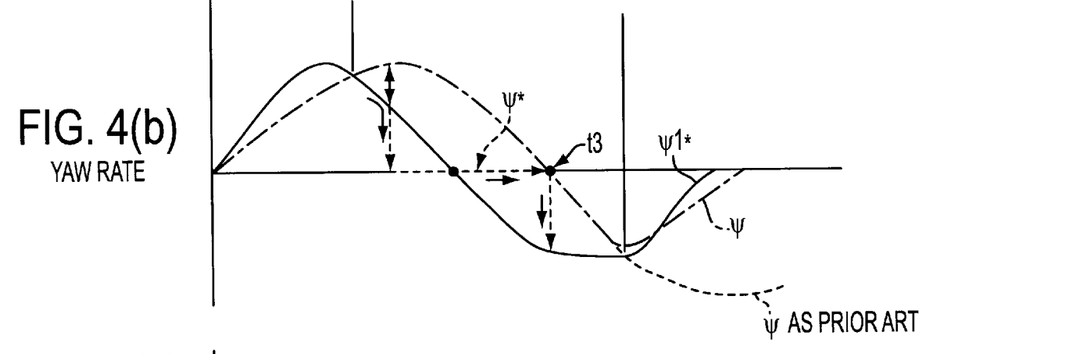
FIG. 4b is a time chart showing the yaw rate $\psi$ and the desired yaw rate $\psi 1^*$.
Figure 4C:
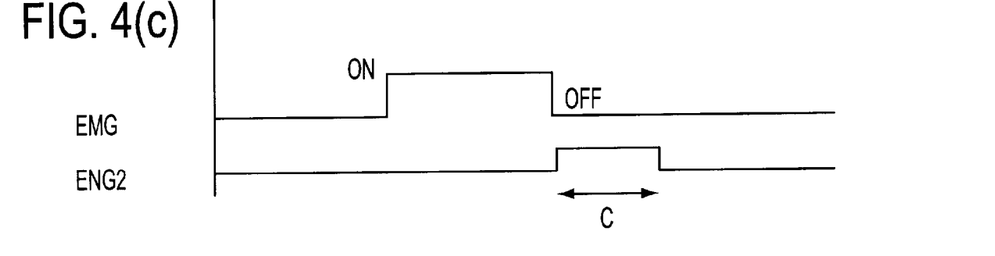
FIG. 4c is a time chart showing the EMG flag and the ENG2 flag.
Figure 4D:
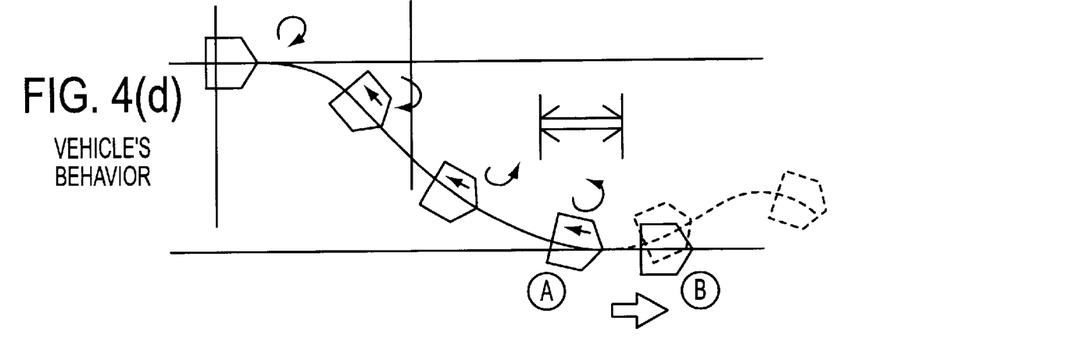
FIG. 4d is a time chart showing the vehicle's behavior.

If the vehicle quickly changes from the driving lane to another driving lane on right side as shown in FIG. 4d, the yaw rate $\psi$ and the desired yaw rate $\psi 1^*$ calculated from angular positioning $\theta$ and vehicle speed Vi are respectively described with a solid line and a broken line as shown in FIG. 4b. When the control unit 17 judges that the vehicle is in the emergency evasion at a point of time t1, the desired yaw rate $\psi^*$ is set to 0 at the step S106 and the yaw rate difference $\Delta\psi^*$ is increased. So the amendment momentum $\Delta M^*$ is increased larger than the one of the conventional yaw rate control apparatus, which calculates it merely according to the yaw rate difference. That is, the amendment momentum $\Delta M^*$ is increased as shown in FIG. 4a.

After the desired yaw rate $\psi^*$ becomes 0 and the desired yaw rate $\psi^*$ reverses in sign at a point of time t2, the amendment momentum $\Delta M^*$ is decreased smaller than the one of the conventional yaw rate control apparatus as shown in FIG. 4a. At a point of time t3, the flag EMG is off because the yaw rate $\psi$ becomes smaller than a determined value B. However, the flag EMG2 is on until the counter value EMG_C become 0. Since the vehicle is experiencing under steer after the point of the t3, the control unit proceeds to the step S210. So the amendment momentum $\Delta M^*$ is calculated at the step S212, the step S213 or at the step S214. That is, the amendment momentum $\Delta M^*$ is decreased smaller than the one of the conventional yaw rate control apparatus. In this embodiment, the yaw rate difference $\Delta\psi^*$ is smaller than the offset value Y, and the amendment momentum $\Delta M^*$ is described as 0 as shown in FIG. 4a.

Since the amendment momentum $\Delta M^*$ increased from the time t1 through the time t2, the vehicle behavior can follow the desired yaw rate without delay right after the emergency evasion. And since the amendment momentum $\Delta M^*$ decreased after the time t2, the vehicle can converge on straight-ahead without being influenced by excessive yaw momentum when the vehicle is converging on straight-ahead from the point A through the point B as shown in FIG. 4d. Furthermore, since the yaw rate that urges the vehicle toward an inward curve is restrained for a predetermined time after the emergency evasion, the vehicle can converge on straight-ahead without being influenced by excessive yaw momentum during term C.

Figure 5:
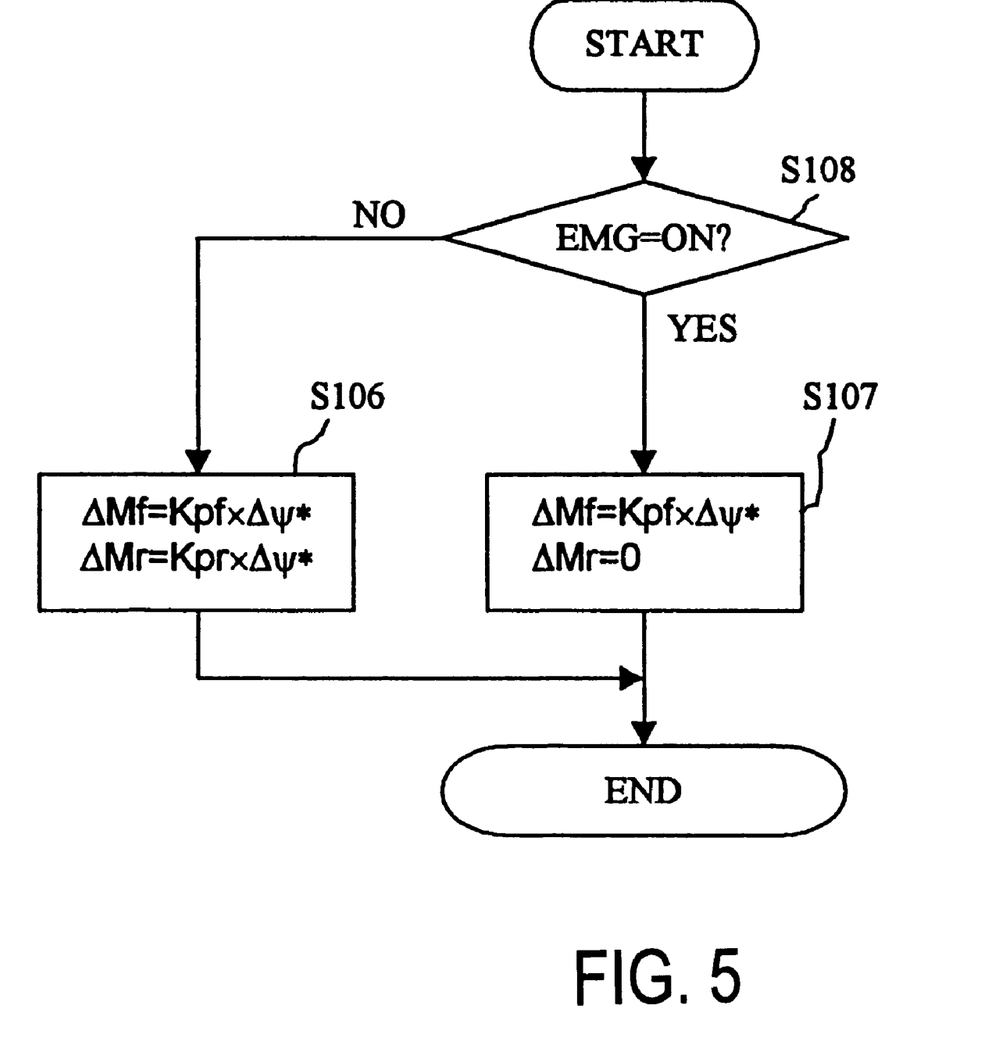
FIG. 5 is a flow chart illustrating the programming of the digital computer as it is used for the vehicle yaw rate control apparatus of another preferred embodiment of the present invention.

Referring to FIG. 5, there is shown a second embodiment of the present invention. In this embodiment, the control unit 17 calculates the yaw moment respectively for the front wheels and rear wheels instead of the steps S212~S216 shown in the FIG. 4.

At the step S301, the control unit 17 judges whether or not the emergency evasion judging flag EMG is on. If the emergency evasion judging flag EMG is off, the control unit 17 proceeds to the step S302. At the step S302, the amendment momentum for the front wheels is calculated as $\Delta Mf = Kpf^* \times \Delta\psi^*$ and the amendment momentum for the rear wheels is calculated as $\Delta Mr = Kpr^* \times \Delta\psi^*$. If the emergency evasion judging flag EMG is on, the control unit 17 proceeds to the step S303. At the step S303, the amendment momentum for the front wheels is calculated as $\Delta Mf = Kpf^* \times \Delta\psi^*$ and the amendment momentum for the rear wheels is calculated as 0.

Both of the front wheels' braking force and the rear wheels' braking force are operated according to respective amendment momentum calculated at the step S302 without emergency evasion. The vehicle undergoes the force to have the vehicle turn around the front axis as the center of cornering if only the front wheels are operated. This motion has the driver feel a lowering of the car's rigidity. And operating the front wheels has the drive feel that the steering operating force is affected. So normally the control unit 17 mainly operates the rear wheels' braking force. On the other hand, the amendment momentum for the rear wheels is limited at the step S303. There are two reasons. In the first place, the line pressure is increased by the pressure increasing pump 3 in this embodiment if the driver does not operate the brake pedal 4. The line pressure increasing speed is dependent on the capacity of the pressure increasing pump 3. So this present invention converges the line pressure on the front wheels in order to increase the line pressure as fast as possible because operating braking force between the front right wheel and the front left wheel is more efficient for the stability control than the rear wheels. In the second place, when the vehicle is in the condition of emergency evasion, the vehicle lateral slip angle $\beta$ becomes large. In this case, this present invention stops increasing the rear braking force in order to take advantage of the lateral force generated by rear tires as much as possible.

Figure 6:
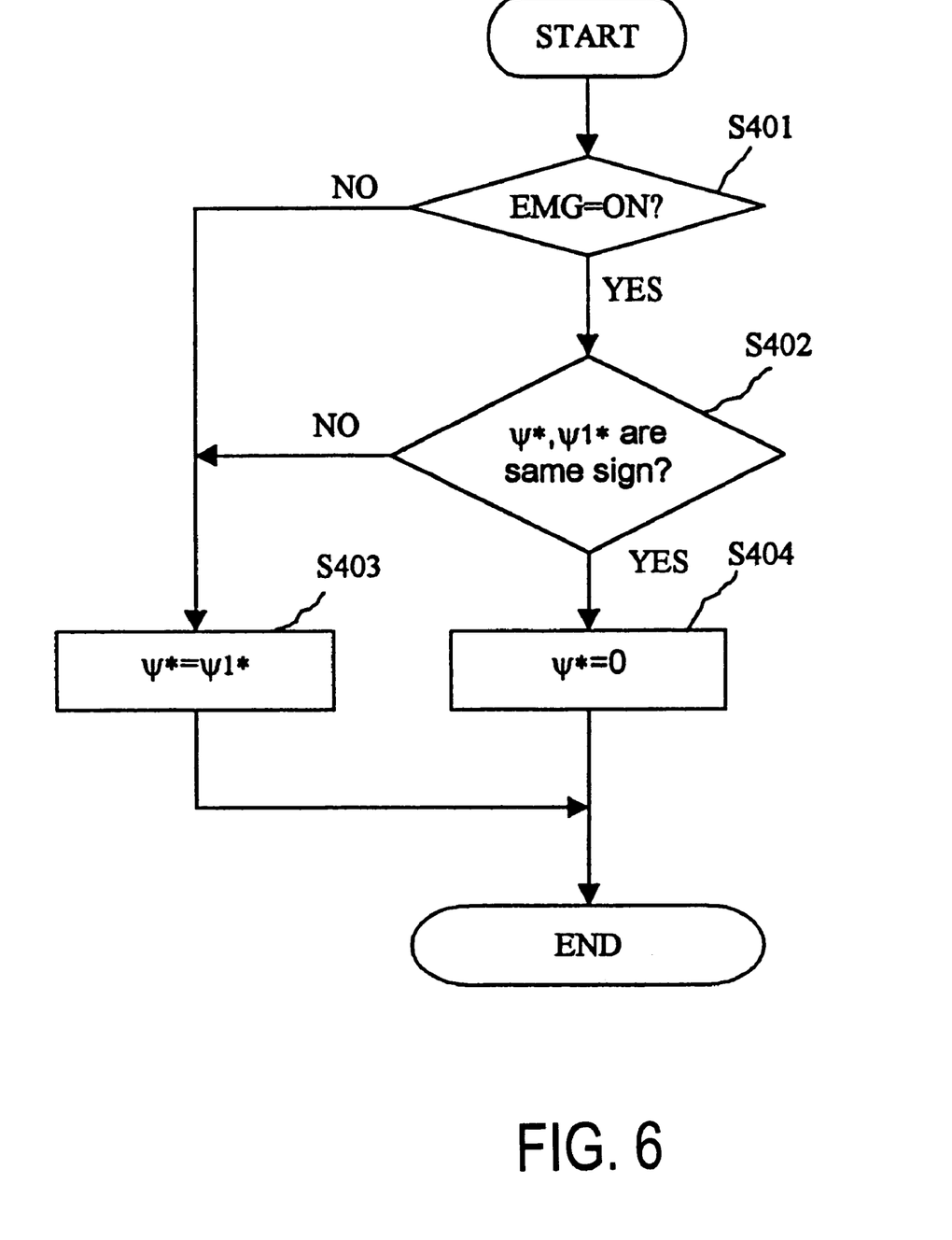
FIG. 6 is a flow chart illustrating the programming of the digital computer as it is used for the vehicle yaw rate control apparatus of another preferred embodiment of the present invention.
Figure 7A:
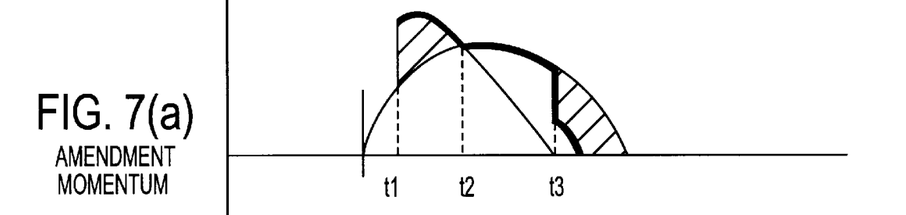
FIG. 7a is a time chart showing the amendment momentum.
Figure 7B:
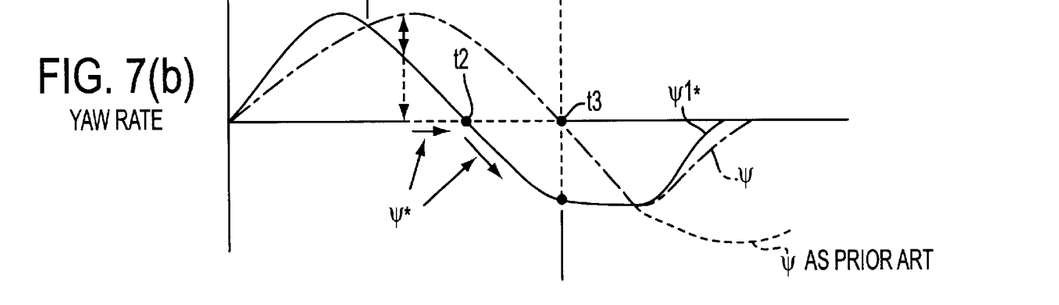
FIG. 7b is a time chart showing the yaw rate $\psi$ and the desired yaw rate $\psi 1^*$.
Figure 7C:
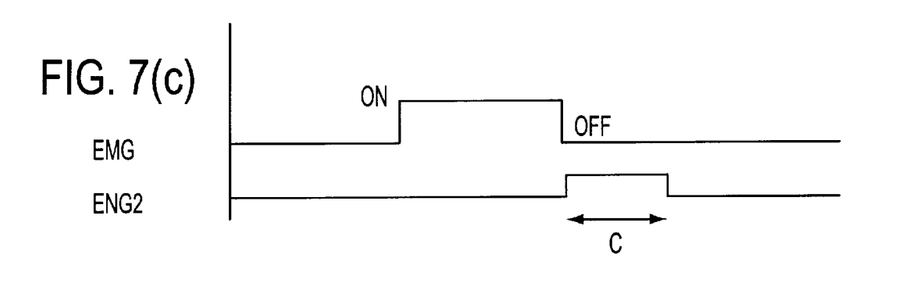
FIG. 7c is a time chart showing the EMG flag and the ENG2 flag.
Figure 7D:
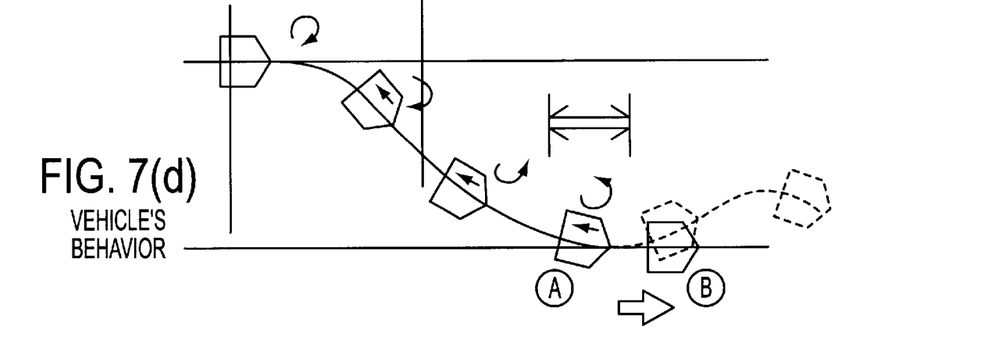
FIG. 7d is a time chart showing the vehicle's behavior.

Referring to FIG. 6, there is shown a third embodiment of the present invention. In this embodiment, the control unit 17 calculates the yaw moment more minutely to increase the amendment momentum $\Delta M^*$ much more from the point D through the point E as shown in the FIG. 6. This embodiment corresponds to an improvement of the steps S105~S107 shown in the FIG. 2.

At the step S401, the control unit 17 judges whether or not the emergency evasion judging flag EMG is on. If the emergency evasion judging flag EMG is on, the control unit 17 proceeds to the step S402. At the step S402, the control unit 17 judges whether or not the yaw rate ψ and the desired yaw rate ψ1* are of the same sign. If the yaw rate ψ and the desired yaw rate ψ1* are of the same sign, the control unit 17 proceeds to the step S404. At the step S404, the control unit 17 sets 0 as the desired yaw rate ψ*. On the other hand, at the step S403, the control unit 17 sets the first desired yaw rate ψ1* as the desired yaw rate ψ*.

Therefore, when the desired yaw rate ψ1* reverses in sign after the time t2, the desired yaw rate ψ1* is set as the desired yaw rate ψ* until the time t3. That is, the amendment momentum ΔM* becomes larger than one which is calculated when the desired yaw rate ψ1* is set as 0. Consequently, the control unit 17 executes to restrain the yaw moment more effectively right after the control unit 17 judges that the vehicle is in emergency evasion as shown in FIG. 7.

What is claimed is:

1. A vehicle stability control apparatus, comprising:
   a yaw rate sensor to detect a yaw rate of a vehicle;
   a physical amount detector to detect a physical amount input in the vehicle;
   a yaw momentum control apparatus to control yaw momentum of the vehicle in response to a control signal; and
   a control unit operatively coupled with the yaw rate sensor, the physical amount detector, and a yaw momentum control apparatus; wherein
   the control unit calculates a first desired yaw rate for the vehicle from the physical amount;
   the control unit sets the first desired yaw rate as a desired yaw rate;
   the control unit judges that the vehicle is in an emergency evasion condition when the difference between the yaw rate and the first yaw rate is larger than a first value;
   the control unit sets 0 or nearly 0 as a desired yaw rate when the control unit judges that the vehicle is in the emergency evasion condition; and
   the control unit applies the control signal to the yaw momentum control apparatus to reduce the difference between the yaw rate and the desired yaw rate.

2. A vehicle stability control apparatus as claimed in claim 1, wherein the physical amount detector comprises:
   a vehicle velocity detector to detect a vehicle velocity; and
   an angular sensor for detecting angular positioning of a steering wheel.

3. A vehicle stability control apparatus as claimed in claim 1, wherein the control unit stops judging that the vehicle is in the emergency evasion condition when the difference between the yaw rate and the first desired yaw rate is smaller than a second value, which is smaller than the first value, or when the yaw rate becomes 0 or nearly 0.

4. A vehicle stability control apparatus as claimed in claim 3, further comprising an under steer detector to detect under steer of the vehicle;
   wherein the control unit limits the control signal so as to decrease yaw momentum controlled by the yaw momentum control apparatus for a predetermined time after the control unit stops judging the vehicle is in the emergency evasion condition if the under steer detector detects under steer.

5. A vehicle stability control apparatus as claimed in claim 1, wherein the yaw momentum control apparatus comprises:
   a hydraulic circuit fluidly disposed for applying braking force to the front and rear wheels;
   a source of braking fluid for supplying the braking fluid to said hydraulic circuit; and
   an electromagnetic valve included in said hydraulic circuit for adjusting braking pressure applied to wheels in response to the control signal.

6. A vehicle stability control apparatus as claimed in claim 5, wherein the control unit limits adjustment of braking pressure applied to the rear wheels while the control unit judges that the vehicle is in the emergency evasion condition.

7. A vehicle stability control apparatus as claimed in claim 1, wherein the control unit sets 0 or nearly 0 as the desired yaw rate when the control unit judges that the vehicle is in the emergency evasion condition and both of the yaw rate and the first desired yaw rate are of same sign.

8. A vehicle stability control apparatus, comprising:
   a yaw rate sensor to detect a yaw rate of a vehicle;
   a physical amount detector to detect a physical amount input in the vehicle;
   a yaw momentum control apparatus to control yaw momentum of the vehicle in response to a control signal; and
   a control unit operatively coupled with the yaw rate sensor, the physical amount detector, and a yaw momentum control apparatus; wherein
   the control unit calculates a first desired yaw rate for the vehicle from the physical amount;
   the control unit judges whether the vehicle is in a normal condition or an emergency evasion condition, the control unit judging that the vehicle changes from the normal condition to the emergency evasion condition when the difference between the yaw rate and the first yaw rate is larger than a first value;
   the control unit sets the first desired yaw rate as a desired yaw rate;
   the control unit sets 0 or nearly 0 as the desired yaw rate when the control unit judges that the vehicle is in the emergency evasion condition;
   the control unit applies the control signal to the yaw momentum control apparatus to reduce the difference between the yaw rate and the desired yaw rate.

9. A vehicle stability control apparatus as claimed in claim 8, wherein the physical amount detector comprises:
   a vehicle velocity detector to detect a vehicle velocity; and
   an angular sensor for detecting angular positioning of a steering wheel.

10. A vehicle stability control apparatus as claimed in claim 8, wherein the control unit judges that the vehicle changes from the emergency evasion condition to the normal condition when a difference between the yaw rate and the first desired yaw rate is smaller than a second value, which is smaller than the first value, or when the yaw rate becomes 0 or nearly 0.

11. A vehicle stability control apparatus as claimed in claim 10, further comprising an under steer detector to detect under steer of the vehicle;
    wherein the control unit limits the control signal so as to decrease yaw momentum controlled by the yaw momentum control apparatus for a predetermined time after the control unit judges that the vehicle changes from the emergency evasion condition to the normal condition.

12. A vehicle stability control apparatus as claimed in claim 8, wherein the yaw momentum control apparatus comprises:
- a hydraulic circuit fluidly disposed for applying braking force to front and rear wheels;
- a source of braking fluid for supplying the braking fluid to said hydraulic circuit; and
- an electromagnetic valve included in said hydraulic circuit for adjusting braking pressure applied to wheels in response to the control signal.

13. A vehicle stability control apparatus as claimed in claim 12, wherein the control unit limits adjustment of braking pressure applied to the rear wheels while the control unit judges that the vehicle is in the emergency evasion condition.

14. A vehicle stability control apparatus as claimed in claim 8, wherein the control unit sets 0 or nearly 0 as the desired yaw rate when the control unit judges that the vehicle is in the emergency evasion condition and both of the yaw rate and the first desired yaw rate are of same sign.

15. A vehicle stability control apparatus, comprising:
- means for detecting a yaw rate of a vehicle;
- means for detecting a physical amount, the physical amount being input in the vehicle;
- means for controlling yaw momentum of the vehicle in response to a control signal;
- means for calculating a first desired yaw rate for the vehicle from the physical amount;
- means for setting the first desired yaw rate as a desired yaw rate;
- means for judging whether the vehicle is in an emergency evasion condition when the difference between the yaw rate and the first yaw rate is larger than a first value;
- means for setting 0 or nearly 0 as a desired yaw rate when the means for judging judges that the vehicle is in an emergency evasion condition;
- means for applying the control signal to the means for controlling yaw momentum to reduce the difference between the yaw rate and the desired yaw rate.

16. A vehicle stability control apparatus, comprising:
- means for detecting a yaw rate of a vehicle;
- means for detecting a physical amount, the physical amount being input in the vehicle;
- means for calculating a first desired yaw rate for the vehicle from the physical amount;
- means for judging whether the vehicle is in a normal condition or emergency evasion condition, judging that the vehicle changes from the normal condition to the emergency evasion condition when the difference between the yaw rate and the first yaw rate is larger than a first value;
- means for setting the first desired yaw rate as a desired yaw rate when the means for judging judges that the vehicle is in the normal condition;
- means for setting 0 or nearly 0 as the desired yaw rate when the control unit means for judging judges as the vehicle is on the emergency evasion condition;
- means for applying the control signal to a yaw momentum control apparatus to reduce the difference between the yaw rate and the desired yaw rate.

* * * * *